United States Patent
Vipul et al.

(10) Patent No.: US 8,078,905 B1
(45) Date of Patent: Dec. 13, 2011

(54) RESTORING CONFIGURATIONS OF DATA STORAGE SYSTEMS

(75) Inventors: Utkarsh Vipul, Westborough, MA (US); Manish Patel, Gujarat (IN); Xuan Tang, Hopkinton, MA (US); Scott Von Rhee, Boston, MA (US); David Haase, Fuquay Varina, NC (US)

(73) Assignee: EMC Corporation, Hopkinton, MA (US)

( * ) Notice: Subject to any disclaimer, the term of this patent is extended or adjusted under 35 U.S.C. 154(b) by 155 days.

(21) Appl. No.: 12/619,178

(22) Filed: Nov. 16, 2009

(51) Int. Cl.
*G06F 11/00* (2006.01)
(52) U.S. Cl. ......... 714/6.1; 714/6.2; 714/6.21; 714/6.22
(58) Field of Classification Search ............... 714/6.1, 714/6.2, 6.21, 6.22
See application file for complete search history.

(56) References Cited

U.S. PATENT DOCUMENTS

| | | | |
|---|---|---|---|
| 6,058,454 A * | 5/2000 | Gerlach et al. | 711/114 |
| 6,952,794 B2 * | 10/2005 | Lu | 714/6.22 |
| 6,985,971 B2 * | 1/2006 | Wang et al. | 710/10 |
| 7,236,987 B1 * | 6/2007 | Faulkner et al. | 1/1 |
| 7,290,168 B1 * | 10/2007 | DeKoning | 714/5.11 |
| 7,315,807 B1 * | 1/2008 | Lavallee et al. | 703/21 |
| 7,376,761 B2 * | 5/2008 | Dubal et al. | 710/8 |
| 7,383,381 B1 * | 6/2008 | Faulkner et al. | 711/114 |
| 7,405,942 B1 * | 7/2008 | Lewis | 361/727 |
| 7,430,568 B1 * | 9/2008 | DeKoning et al. | 1/1 |
| 7,447,939 B1 * | 11/2008 | Faulkner et al. | 714/6.13 |
| 2002/0188697 A1 * | 12/2002 | O'Connor | 709/219 |
| 2002/0196744 A1 * | 12/2002 | O'Connor | 370/254 |
| 2007/0061125 A1 * | 3/2007 | Bhatt et al. | 703/20 |
| 2007/0070833 A1 * | 3/2007 | Long | 369/30.64 |
| 2009/0080399 A1 * | 3/2009 | Wang et al. | 370/338 |

* cited by examiner

*Primary Examiner* — Robert Beausoliel, Jr.
*Assistant Examiner* — Joshua P Lottich
(74) *Attorney, Agent, or Firm* — Krishnendu Gupta; Jason A. Reyes; John T. Hurley

(57) ABSTRACT

A method is used in restoring configurations of data storage system. A captured configuration is produced from capturing a configuration of a data storage system. The configuration includes a mapping of hierarchical objects. The captured configuration is used to help ensure that the configuration is not corrupted.

18 Claims, 4 Drawing Sheets

RESTORING CONFIGURATIONS OF DATA STORAGE SYSTEMS

BACKGROUND

1. Technical Field

This application generally relates to restoring configurations of data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

RAID (Redundant Array of Independent or Inexpensive Disks) parity schemes may be utilized to provide error detection during the transfer and retrieval of data across a storage system (also known as storage arrays or arrays).

RAID, logical disk units, disk drives and other objects and concepts make up layers of legacy array logical components mapped to one another, and any errors in such mapping may adversely affect access to data.

SUMMARY OF THE INVENTION

A method is used in restoring configurations of data storage system. A captured configuration is produced from capturing a configuration of a data storage system. The configuration includes a mapping of hierarchical objects. The captured configuration is used to help ensure that the configuration is not corrupted.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

As described below, a technique is provided that may be used in restoring configurations of data storage systems, particularly for providing an automated method for checking data storage system configurations to ensure that the configurations are not corrupt.

Conventionally, traditional restoring methods for storage system configurations require manual performance of data entry, resulting in poor reliability due to human error. However, by use of the technique described herein, an automated process allows for automatic configuration restoration. In particular, the technique may be used to restore corrupted configurations when the system detects lost meta data or objects, such as mapped LUNs or pools as described below.

In at least one implementation of the technique as described in more detail below, the automated restoration process reads an XML configuration file, which is an XML file, containing diagnostic information of a particular system configuration. A script-driven internal engine checks a current version of the configuration against the XML configuration file to detect any possible discrepancies. If the configuration is corrupt, the system detects the discrepancy and automatically rebuilds the configuration based on the XML configuration file. User data remains intact while the meta data and configuration is restored.

Figure 1:
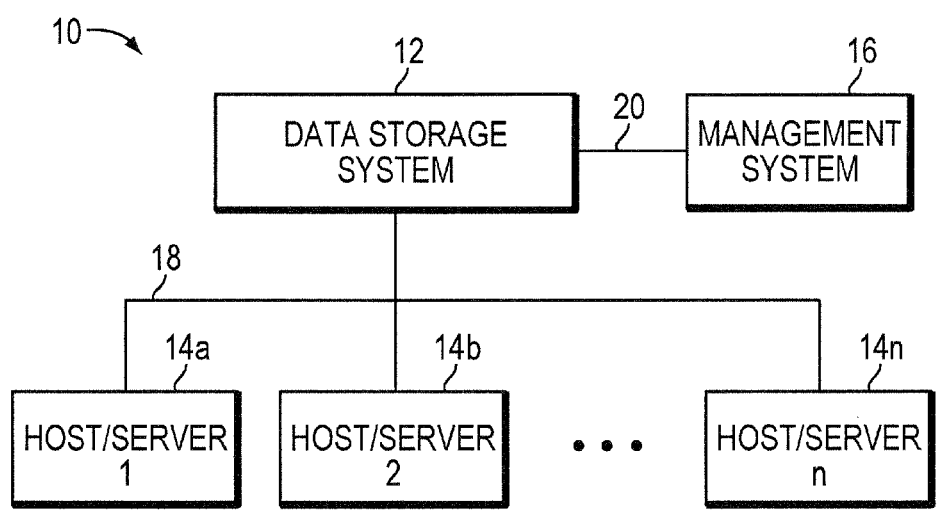
FIG. 1 is an example of an embodiment of a system that may utilize the techniques described herein.

Referring to FIG. 1, shown is an example of an embodiment of a computer system that may be used in connection with performing the technique described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring and provisioning the data storage for use by the hosts in connection with techniques described herein. As an example that may executed on the hosts 14a-14n, the data storage configuration and provisioning tasks may include allocating storage for user accounts or mailboxes, specifying the devices (logical and/or physical) used to store the email data, specifying whether data replication is performed for disaster recovery, configuring the physical devices in one or more RAID groups and other logical entities, and the like. Techniques that may be used in connection with performing data storage configuration, and configuration and provisioning tasks are described in more detail in following paragraphs.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the technique as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. Data storage devices may also be configured using other logical device layers on top of the LV or LUN which are then exposed to the host or other component using the configured data storage.

In the following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Described in the following paragraphs are techniques that may be used in restoring configurations of data storage systems in an automated fashion, which, for example, may be customized for checking data storage system configurations to ensure that the configurations are not corrupt. However, the described applications and implementations are only examples; the techniques herein may be adaptable to other applications and/or to the particular knowledge level of the user.

Figure 2:
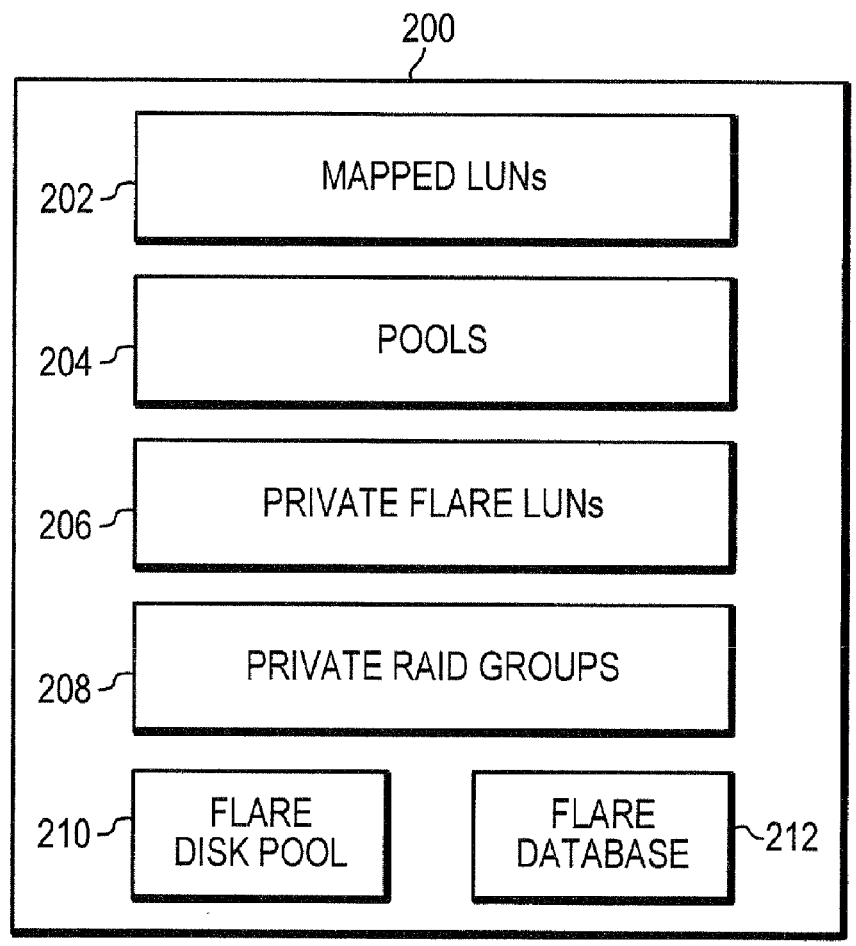
FIG. 2 is an example representation of array logical components in at least one embodiment of the techniques described herein.

Referring to FIG. 2, shown is an example representation of legacy array logical components in an embodiment of an array 200 in accordance with the techniques herein. The array 200 may be included in the data storage system 12. FIG. 2 illustrates how Mapped Logical Unit Numbers (LUNs) 202 are created on top of the legacy array logical components, such as RAID Groups and data storage operating system ("Flare") local volumes referred to as Flare LUNs or FLUs. A Persistent Storage Manager Lun (PSM), not shown, is located on the first five drives of the array 200 and stores configuration information, typically used for diagnostic purposes, such as disks, RAID Groups, and FLUs. Flare Disk Pool 210 is a named collection of disks managed by Flare, used to create storage pools, which include groups of disks configured to be in a single pool of storage. Flare database 212 keeps track of RAID Groups and FLUs, particularly, which RAID Groups are contained within each FLU.

Private RAID Groups 208 and Private FLUs 206 are built on top of the Flare Disk Pool 210, Flare database 212, and PSM. Both 206 and 208 are private, as they are not directly visible or accessible by the user. Storage pools 204 are then built on top of the Private RAID Groups 208 and Private FLUs 206. For example, the storage pools 204 may include thin pools, which are types of storage pool. (A description of storage pools and some information associated with storage pool creation is provided in the patent application entitled CONTROLLING MULTI-STEP STORAGE MANAGEMENT OPERATIONS, patent application Ser. No. 12/241,417, filed Sep. 30, 2008, which is hereby incorporated by reference herein.) Mapped LUNs 202 are built on top of the storage pools 204. Mapped LUNs 202 are formed from storage pools 204 and may store data that is physically stored in a location that maps to the logical location of the Mapped LUNs 202.

FIG. 2 illustrates a conventional configuration of array logical components in at least one embodiment of the technique described herein. Meta data exists on the array 200 and represents at least some of the configuration of the array 200. The meta data helps describe how each object of the array 200 is stored above one another and in what order each is stored. The meta data will be described in further detail below. Each array 200 configuration may differ depending on the implementation.

Figure 3:
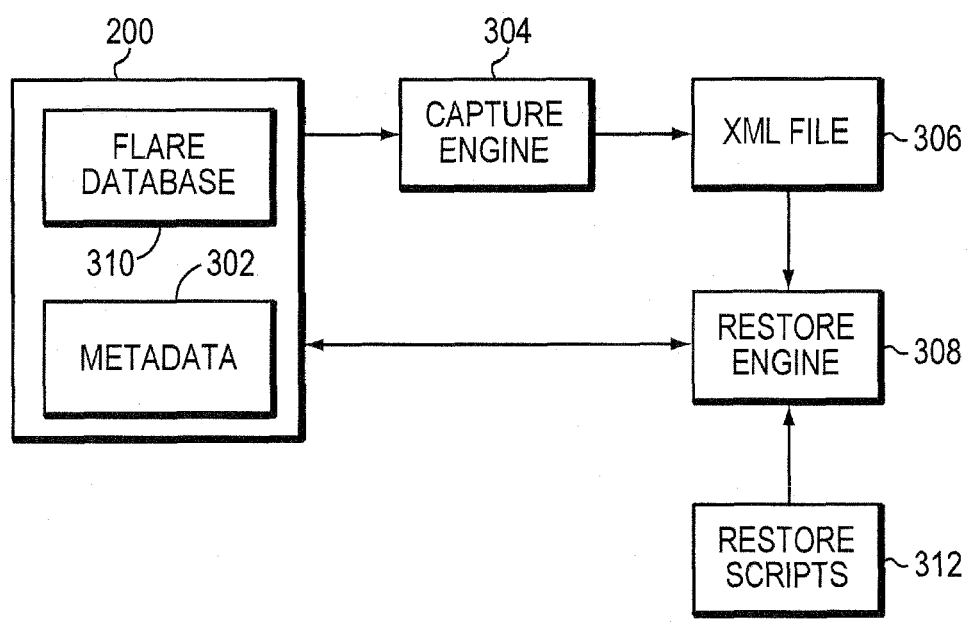
FIG. 3 is an example representation of an application in connection with the techniques herein.

Referring to FIG. 3, shown is an example representation of an application using the techniques herein with the array 200 as described in connection with FIG. 2. In this example, a capture engine 304 (also referred to as a diagnostic information pool) captures a mapping of configuration information of the data storage system through a Storage Processor Collect (SP Collect). The SP Collect is a special software utility offered by the data storage system that generates log files of at least a portion of the configuration. In at least one instance, the capture engine 304 may be or include the SP Collect. The capture engine 304 reviews the log files from the SP Collect and writes the configuration to an XML file 306, also known as the captured configuration. In at least one embodiment, this process is automated and may occur automatically or during certain events. For example, in at least one case, whenever the array 200 reboots, the SP Collect collects a snapshot of the configuration of the system, saves it to the capture engine 304 and the capture engine 304 writes the captured configuration to the XML file 306.

The array 200 includes meta data 302. The meta data 302 exists on the PSM and describes the configuration of the array 200 at its current state. For example, with the configuration information contained within the meta data 302, the array 200 may be completely rebuilt with new hardware. In at least one embodiment, the meta data 302 contains all configuration information on the array 200 and is a snapshot of the entire configuration, including IP addresses, RAID Groups, FLUs, storage pools and other logical objects. The meta data 302 is captured by the SP Collect and capture engine 304 and is written to the XML file 306. In at least one embodiment, as stated above, the capture engine 304 uses the meta data 302 to capture the configuration information.

In at least one embodiment, the meta data 302 is captured by the capture engine 304 at least once a day. As described herein, this is used as a safeguard to help ensure the meta data 302 is not corrupt. If the PSM or meta data 302 are corrupted at some point during the day, the captured configuration may be used to rebuild the array 200 without any loss of data. For example, the meta data 302 or PSM may be faulted or corrupted by software bundles accessing the meta data 302 or PSM. In yet another example, if the software bundle is corrupted, the software bundle may corrupt the meta data 302.

Conventionally, once corruption of the meta data 302 has occurred, recovery of lost data potentially involved performing hundreds of manual steps to find the lost data, performing the manual steps, and verifying the data has successfully been retrieved. By contrast, in accordance with the technique described herein, as shown in FIG. 3, a restore engine 308 and restore scripts 312 are now provided.

In at least one implementation, the restore engine 308 reads the captured configuration from the XML file 306 and operates in accordance to the restore scripts 312. In at least one embodiment, based on the restore scripts 312, the meta data 302 and configuration in its current state is read from the array 200 and is compared to the captured configuration from the XML file 306. This technique may help to ensure that the configuration is not corrupt, or alternatively, it may help detect that the configuration is corrupt and help determine where the corruption occurred.

Figure 4:
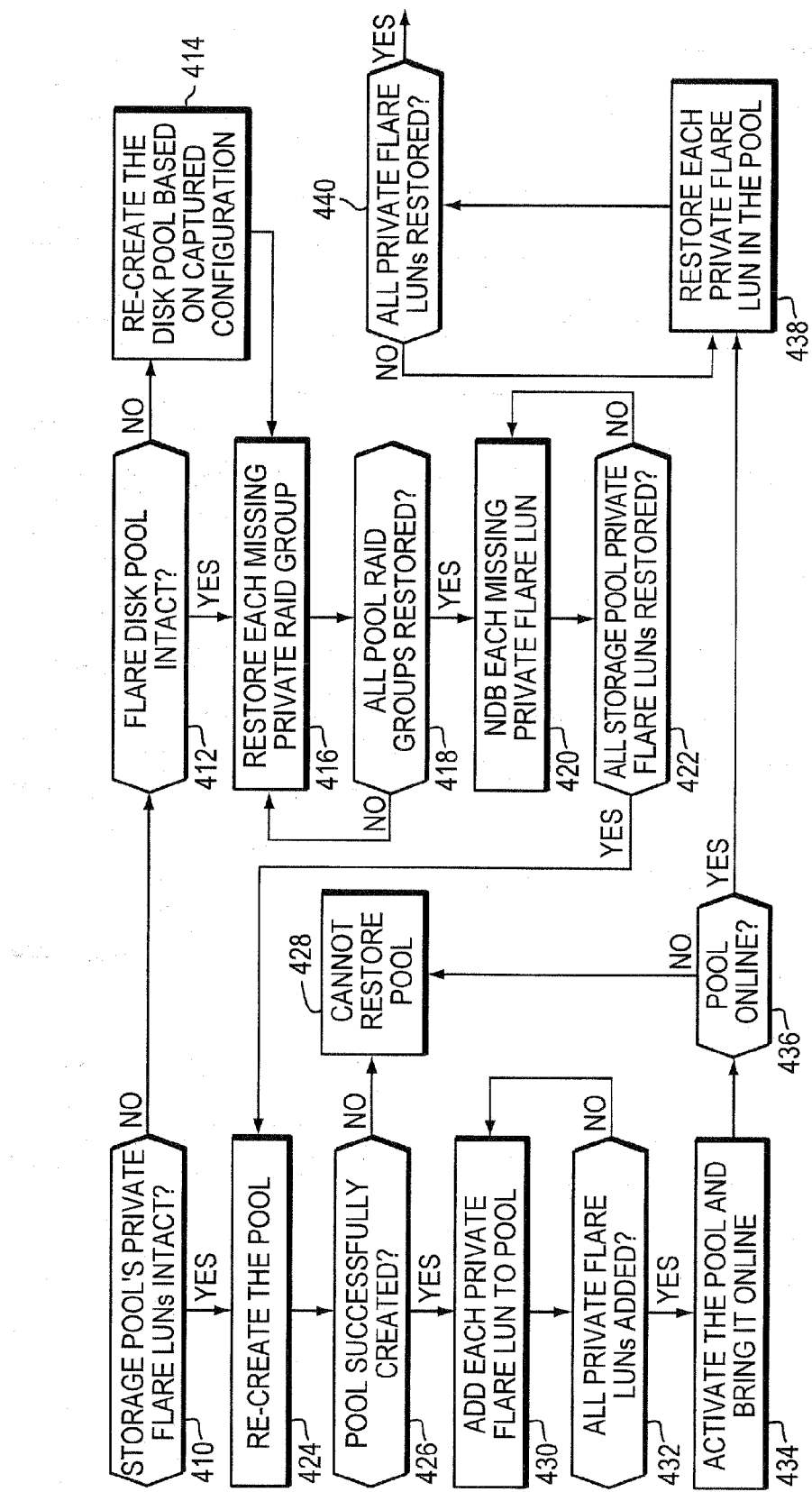
FIG. 4 is an example representation of processes that may be performed in an embodiment in accordance with the techniques herein.

Also referring to FIG. 4, the restore scripts 312 from FIG. 3 specify comparisons that the restore engine 308 makes between the configuration in its current state, including from the meta data 302 of the array 200, and the captured configuration from the XML file 306. Private Flare LUNs 206 are checked to ensure that they are intact according to the captured configuration (step 410). If the private Flare LUNs 206 are intact, execution is continued at step 424 described below. If the private Flare LUNs 206 are not intact, it must be determined whether the Flare Disk Pool 210 is intact (step 412). If the Flare Disk Pool 210 is intact, execution is continued at step 416, otherwise the Flare Disk Pool 210 is re-created based on the captured configuration from the XML file 306 (step 414). Each missing private RAID Group 208 is then restored based on the captured configuration of the XML file 306 (step 416). Each private RAID Group 208 is then ensured to have been successfully restored (steps 416-418).

Upon restoration of all private RAID Groups 208, each private Flare LUN 206 runs through a non-destructive bind process, such that each private Flare LUN 206 may be restored without losing any data, if corrupted (step 420). Each private Flare LUN 206 is then ensured to have been successfully restored (steps 420-422).

Upon restoration of all private Flare LUNs 206 (or if the private Flare LUNs 206 are intact from step 410), each pool 204 is re-created based on the captured configuration of the XML file 306 (step 424). Each pool 204 is then ensured to have been successfully restored (step 426). If not successfully restored, the pools 204 and the meta data 302 cannot be restored (step 428). If the pools 204 have been successfully restored, each restored private Flare LUN 206 is added back to the pool 204 (step 430). Each private Flare LUN 206 is then ensured to have been successfully added to the pool 204 (steps 430-432).

Upon addition of all private Flare LUNs 206 to the pool 204, the pool 204 is activated and is brought back online (step 434). It is then determined whether the pool 204 has been successfully brought online (step 436). If not, the pool 204 cannot be restored (step 428).

If the pool 204 has successfully come online, each private Flare LUN 206 is restored (step 438). Each private Flare LUN 206 is then ensured to have successfully been restored in the pool 204, in which case, the meta data 302 may successfully be restored and no data will be lost (steps 438-440).

As described above, with respect to the restore engine 308 and the captured configuration of the XML file 306, the restore engine 308 checks the XML file 306 against the meta data 302 and configuration in its current state on the array 200 using the restore scripts 312.

The following describes an example of checks the restore engine 308 executes. With regard to the examples herein, the term "thinpool" may be used synonymously with pool 204, "Private RG" represents private RAID Group 208 and "Private LUN" or "thinlun" represents private Flare LUNs 206.

As it may be determined from the following excerpt of a corresponding captured configuration from the XML file 306 in relation to Step 1 below, the restore engine 308 ensures that each disk exists and is intact. It may be determined that the bus type is 0, the enclosure type is 0, and the disk slot is 14.
</CLAR:SPS>
</CLAR:SPSs>
<CLAR:Disks type="Container">
<CLAR:Disk type="Category">
<CLAR:Bus type="Property">0</CLAR:Bus>
<CLAR:Enclosure type="Property">0</CLAR:Enclosure>
<CLAR:Slot type="Property">14</CLAR:Slot>

Step 1: Initial checks are first executed using the captured configuration of the XML file above against the current state of the array 200 to help ensure that the Flare database 212, any other possible software packages, and the Flare disk pool 210 are intact and not corrupt.
19-OCT-2009 20:06:20.906-I-Checking for committed FLARE Operating Environment
19-OCT-2009 20:06:20.937-I-Checking compatibility of installed software packages.
19-OCT-2009 20:06:21.671-I-Checking required Disk 14 Enclosure 0 Bus 0
19-OCT-2009 20:06:21.687-I-Checking required Disk 13 Enclosure 0 Bus 0
19-OCT-2009 20:06:21.718-I-Checking required Disk 12 Enclosure 0 Bus 0
19-OCT-2009 20:06:21.734-I-Checking required Disk 11 Enclosure 0 Bus 0
19-OCT-2009 20:06:21.750-I-Checking required Disk 10 Enclosure 0 Bus 0
19-OCT-2009 20:06:21.781-I-Checking required Disk 9 Enclosure 0 Bus 0
19-OCT-2009 20:06:21.796-I-Checking required Disk 8 Enclosure 0 Bus 0
19-OCT-2009 20:06:21.843-I-Checking required Disk 7 Enclosure 0 Bus 0
19-OCT-2009 20:06:21.859-I-Checking required Disk 6 Enclosure 0 Bus 0
19-OCT-2009 20:06:21.890-I-Checking required Disk 5 Enclosure 0 Bus 0
19-OCT-2009 20:06:21.906-I-Checking required Disk 4 Enclosure 0 Bus 0
19-OCT-2009 20:06:21.921-I-Checking required Disk 3 Enclosure 0 Bus 0
19-OCT-2009 20:06:21.953-I-Checking required Disk 2 Enclosure 0 Bus 0
19-OCT-2009 20:06:21.968-I-Checking required Disk 1 Enclosure 0 Bus 0
19-OCT-2009 20:06:22.000-I-Checking required Disk 0 Enclosure 0 Bus 0

As it may be determined from the following excerpt from the XML file 306 in relation to Step 2 below, each pool 204 object is checked to exist and is intact. It may be determined that pool 1 exists below, as denoted by Number type.
</CLAR:StorageGroup>
</CLAR:StorageGroups>
<CLAR:Diskpools type="Container">
<CLAR:Diskpool type="Category">
<CLAR: Key type="Property">06:00:00:00:05:00:00:00:01:00:00:00:00:00:00:66</CLAR:Key>
<CLAR:Number type="Property">1</CLAR:Number>

Step 2: Check for pool 204 objects and restore them if they do not exist.
In the following example, pools 0, 1 and 2 do exist, as shown above.
19-OCT-2009 20:06:22.062-I-Checking for minimum Diskpool.
19-OCT-2009 20:06:22.078-I-CheckForMinDiskpool.xml\—There is at least one Diskpool.
19-OCT-2009 20:06:22.093-I-Checking Diskpool 2
19-OCT-2009 20:06:22.109-I-CheckDiskpool.xml\—Diskpool already exists.
19-OCT-2009 20:06:22.109-I-Checking Diskpool 1
19-OCT-2009 20:06:22.109-I-CheckDiskpool.xml\—Diskpool already exists.
19-OCT-2009 20:06:22.109-I-Checking Diskpool 0
19-OCT-2009 20:06:22.109-I-CheckDiskpool.xml\—Diskpool already exists.

As it may be determined from the following excerpt from the XML file 306 in relation to Step 3 below, storage pool 1 exists in the captured configuration below (denoted by Slice Pool 1), but does not exist on the array 200, shown in Step 3 below. This may be an instance of error or corruption on the array 200. While all 3 storage pools exist in the captured configuration, only pool 1 is shown below as an example.
<CLAR:ThinPools type="Container">
<CLAR:ThinPool type="Category">
<CLAR:Key type="Property">02:00:00:00:03:00:00:00</CLAR:Key>
<CLAR:Name type="Property">Slice Pool 1</CLAR:Name>

Step 3: Check for thin pools and restore them if they do not exist. In the example below, storage pool 0, 1 and 2 exist in the captured configuration of the XML file 306, as shown above, but do not exist on the array 200. To overcome this situation and help ensure that no data is lost, the storage pools are restored as an empty shell, such as Thinpools 0, 1 and 2 below.
19-OCT-2009 20:06:22.125-I-Checking for minimum Thinpool
19-OCT-2009 20:06:22.125-I-Creating empty Thinpool 0
19-OCT-2009 20:06:22.265-I-Refreshing the storage system state.
19-OCT-2009 20:06:23.203-I-Checking Thinpool 0
19-OCT-2009 20:06:24.500-I-CheckThinpool.xml\—Thinpool already exists.
19-OCT-2009 20:06:24.500-I-Checking Thinpool 1
19-OCT-2009 20:06:24.500-I-Creating empty Thinpool 1
19-OCT-2009 20:06:24.656-I-Refreshing the storage system state.
19-OCT-2009 20:06:25.781-I-Checking Thinpool 2
19-OCT-2009 20:06:25.781-I-Creating empty Thinpool 2
19-OCT-2009 20:06:25.890-I-Refreshing the storage system state.

As it may be determined from the following excerpt from the XML file 306 in relation to Step 4 below, private RAID Group 237 exists in the captured configuration below.
<CLAR:RAIDGroups type="Container">
<CLAR:RAIDGroup type="Category">
<CLAR:ID type="Property">237</CLAR:ID>

Step 4: Check for private RAID Groups 208 and restore them if they do not exist. In the following example, private RAID Groups 237, 238 and 239 already exist, as shown above.
19-OCT-2009 20:06:27.781-I-Checking for Minimum Raidgroup 239
19-OCT-2009 20:06:27.796-I-CheckForMinRG.xml\—There is at least one Private RG.
19-OCT-2009 20:06:27.843-I-Checking Private Raidgroups for Thinpool 0
19-OCT-2009 20:06:27.875-I-Checking for Private Raidgroup 239
19-OCT-2009 20:06:27.875-I-CheckPvtRG.xml\—Private RG already exist.
19-OCT-2009 20:06:27.875-I-Checking Private Raidgroups for Thinpool 1
19-OCT-2009 20:06:27.890-I-Checking for Private Raidgroup 238
19-OCT-2009 20:06:27.890-I-CheckPvtRG.xml\—Private RG already exist.
19-OCT-2009 20:06:27.890-I-Checking Private Raidgroups for Thinpool 2
19-OCT-2009 20:06:27.890-I-Checking for Private Raidgroup 237
19-OCT-2009 20:06:27.906-I-CheckPvtRG.xml\—Private RG already exist.

As it may be determined from the following excerpt from the XML file 306 in relation to Step 5 below, private Flare LUN 60:06:01:60:20:54:24:00:5 E:D6:E7:01:E4:B8:DE:11 exists in the captured configuration below.
<CLAR:InternalLUNs type="Container">
<CLAR:InternalLUN type="Category">
<CLAR:Name type="Property">Virtual Disk 8191</CLAR:Name>
<CLAR:WWN type="Property">60:06:01:60:20:54:24:00:5 E:D6:E7:01:E4:B8:DE:11</CLAR:WWN>

Step 5: Check for private Flare LUNs 206 and restore them if they do not exist. In the following example, all 18 private Flare LUNs exist on the array 200 from the captured configuration above, so they do not need to repeat the non-destructive bind process again.
19-OCT-2009 20:06:27.937-I-Checking for minimum Private Luns
19-OCT-2009 20:06:28.031-I-CheckForMinLUN.xml\—There is at least one Private LUN.
19-OCT-2009 20:06:28.093-I-Checking Private Luns for Thinpool 0
19-OCT-2009 20:06:28.109-I-Checking for Private LUN 60:06:01:60:20:54:24:00:5 E:D6:E7:01:E4:B8:DE:11
19-OCT-2009 20:06:28.203-I-CheckPvtLUN.xml\—Private LUN already exist.
19-OCT-2009 20:06:28.203-I-Checking Private Luns for Thinpool 0
19-OCT-2009 20:06:28.203-I-Checking for Private LUN 60:06:01:60:20:54:24:00:5F:D6:E7:01:E4:B8:DE:11
19-OCT-2009 20:06:28.218-I-CheckPvtLUN.xml\—Private LUN already exist.
19-OCT-2009 20:06:28.218-I-Checking Private Luns for Thinpool 0
19-OCT-2009 20:06:28.234-I-Checking for Private LUN 60:06:01:60:20:54:24:00:60:D6:E7:01:E4:B8:DE:11
19-OCT-2009 20:06:28.234-I-CheckPvtLUN.xml\—Private LUN already exist.
19-OCT-2009 20:06:28.234-I-Checking Private Luns for Thinpool 0
19-OCT-2009 20:06:28.250-I-Checking for Private LUN 60:06:01:60:20:54:24:00:61:D6:E7:01:E4:B8:DE:11
19-OCT-2009 20:06:28.250-I-CheckPvtLUN.xml\—Private LUN already exist.
19-OCT-2009 20:06:28.250-I-Checking Private Luns for Thinpool 0
19-OCT-2009 20:06:28.265-I-Checking for Private LUN 60:06:01:60:20:54:24:00:62:D6:E7:01:E4:B8:DE:11
19-OCT-2009 20:06:28.265-I-CheckPvtLUN.xml\—Private LUN already exist.
19-OCT-2009 20:06:28.265-I-Checking Private Luns for Thinpool 0
19-OCT-2009 20:06:28.281-I-Checking for Private LUN 60:06:01:60:20:54:24:00:63:D6:E7:01:E4:B8:DE:11
19-OCT-2009 20:06:28.281-I-CheckPvtLUN.xml\—Private LUN already exist.
19-OCT-2009 20:06:28.281-I-Checking Private Luns for Thinpool 1
19-OCT-2009 20:06:28.296-I-Checking for Private LUN 60:06:01:60:20:54:24:00:4 D:DC:3F:1F:FE:BC:DE:11
19-OCT-2009 20:06:28.328-I-CheckPvtLUN.xml\—Private LUN already exist.
19-OCT-2009 20:06:28.328-I-Checking Private Luns for Thinpool 1
19-OCT-2009 20:06:28.343-I-Checking for Private LUN 60:06:01:60:20:54:24:00:4C:DC:3F:1F:FE:BC:DE:11
19-OCT-2009 20:06:28.343-I-CheckPvtLUN.xml\—Private LUN already exist.
19-OCT-2009 20:06:28.343-I-Checking Private Luns for Thinpool 1
19-OCT-2009 20:06:28.359-I-Checking for Private LUN 60:06:01:60:20:54:24:00:4 E:DC:3F:1F:FE:BC:DE:11
19-OCT-2009 20:06:28.359-I-CheckPvtLUN.xml\—Private LUN already exist.
19-OCT-2009 20:06:28.359-I-Checking Private Luns for Thinpool 1
19-OCT-2009 20:06:28.375-I-Checking for Private LUN 60:06:01:60:20:54:24:00:4F:DC:3F:1F:FE:BC:DE:11
19-OCT-2009 20:06:28.375-I-CheckPvtLUN.xml\—Private LUN already exist.
19-OCT-2009 20:06:28.375-I-Checking Private Luns for Thinpool 1

19-OCT-2009 20:06:28.390-I-Checking for Private LUN 60:06:01:60:20:54:24:00:50:DC:3F:1F:FE:BC:DE:11
19-OCT-2009 20:06:28.390-I-CheckPvtLUN.xml\—Private LUN already exist.
19-OCT-2009 20:06:28.390-I-Checking Private Luns for Thinpool 1
19-OCT-2009 20:06:28.390-I-Checking for Private LUN 60:06:01:60:20:54:24:00:51:DC:3F:1F:FE:BC:DE:11
19-OCT-2009 20:06:28.406-I-CheckPvtLUN.xml\—Private LUN already exist.
19-OCT-2009 20:06:28.406-I-Checking Private Luns for Thinpool 2
19-OCT-2009 20:06:28.406-I-Checking for Private LUN 60:06:01:60:20:54:24:00:1C:74:09:2 D:00:BD:DE:11
19-OCT-2009 20:06:28.421-I-CheckPvtLUN.xml\—Private LUN already exist.
19-OCT-2009 20:06:28.421-I-Checking Private Luns for Thinpool 2
19-OCT-2009 20:06:28.453-I-Checking for Private LUN 60:06:01:60:20:54:24:00:1 D:74:09:2 D:00:BD:DE:11
19-OCT-2009 20:06:28.468-I-CheckPvtLUN.xml\—Private LUN already exist.
19-OCT-2009 20:06:28.468-I-Checking Private Luns for Thinpool 2
19-OCT-2009 20:06:28.468-I-Checking for Private LUN 60:06:01:60:20:54:24:00:1 E:74:09:2 D:00:BD:DE:11
19-OCT-2009 20:06:28.484-I-CheckPvtLUN.xml\—Private LUN already exist.
19-OCT-2009 20:06:28.484-I-Checking Private Luns for Thinpool 2
19-OCT-2009 20:06:28.500-I-Checking for Private LUN 60:06:01:60:20:54:24:00:1F:74:09:2 D:00:BD:DE:11
19-OCT-2009 20:06:28.500-I-CheckPvtLUN.xml\—Private LUN already exist.
19-OCT-2009 20:06:28.500-I-Checking Private Luns for Thinpool 2
19-OCT-2009 20:06:28.515-I-Checking for Private LUN 60:06:01:60:20:54:24:00:20:74:09:2 D:00:BD:DE:11
19-OCT-2009 20:06:28.531-I-CheckPvtLUN.xml\—Private LUN already exist.
19-OCT-2009 20:06:28.531-I-Checking Private Luns for Thinpool 2
19-OCT-2009 20:06:28.531-I-Checking for Private LUN 60:06:01:60:20:54:24:00:21:74:09:2 D:00:BD:DE:11
19-OCT-2009 20:06:28.546-I-CheckPvtLUN.xml\—Private LUN already exist.

Step 6: Create the association between the pools and the private Flare LUNs created for the pools.
19-OCT-2009 20:06:28.843-I-Add Private Lun to Thinpool
19-OCT-2009 20:06:29.406-I-Add Private Lun to Thinpool
19-OCT-2009 20:06:29.890-I-Add Private Lun to Thinpool
19-OCT-2009 20:06:30.359-I-Add Private Lun to Thinpool
19-OCT-2009 20:06:30.765-I-Add Private Lun to Thinpool
19-OCT-2009 20:06:31.203-I-Add Private Lun to Thinpool
19-OCT-2009 20:06:31.578-I-Add Private Lun to Thinpool
19-OCT-2009 20:06:32.078-I-Add Private Lun to Thinpool
19-OCT-2009 20:06:32.468-I-Add Private Lun to Thinpool
19-OCT-2009 20:06:32.906-I-Add Private Lun to Thinpool
19-OCT-2009 20:06:33.343-I-Add Private Lun to Thinpool
19-OCT-2009 20:06:33.750-I-Add Private Lun to Thinpool
19-OCT-2009 20:06:34.156-I-Add Private Lun to Thinpool
19-OCT-2009 20:06:34.593-I-Add Private Lun to Thinpool
19-OCT-2009 20:06:35.015-I-Add Private Lun to Thinpool
19-OCT-2009 20:06:35.468-I-Add Private Lun to Thinpool
19-OCT-2009 20:06:35.921-I-Add Private Lun to Thinpool
19-OCT-2009 20:06:36.359-I-Add Private Lun to Thinpool Step 7: Activate the private Flare LUNs in the storage pools.
19-OCT-2009 20:06:42.140-I-Activate Private Luns in Thinpool 0
19-OCT-2009 20:06:42.343-I-Activate Private Luns in Thinpool 1
19-OCT-2009 20:06:42.500-I-Activate Private Luns in Thinpool 2

Step 8: Wait for the storage pools to enter a state of initialization.
19-OCT-2009 20:06:42.828-I-Waiting for transition of Thinpool 0
19-OCT-2009 20:06:42.843-I-Refreshing the storage system state.
19-OCT-2009 20:06:44.593-I-It is in initializing state
19-OCT-2009 20:06:46.593-I-Waiting for transition of Thinpool 0
19-OCT-2009 20:06:46.593-I-It is not in initializing state
19-OCT-2009 20:06:46.593-I-Waiting for transition of Thinpool 1
19-OCT-2009 20:06:46.593-I-It is not in initializing state
19-OCT-2009 20:06:46.593-I-Waiting for transition of Thinpool 2
19-OCT-2009 20:06:46.609-I-It is not in initializing state Step 9: Destroy the process objects associated with the thin pool creation operation.
19-OCT-2009 20:06:46.625-I-Destroying Process Objects for Thinpool 0
19-OCT-2009 20:06:47.296-I-Destroying Process Objects for Thinpool 1
19-OCT-2009 20:06:47.859-I-Destroying Process Objects for Thinpool 2

As it may be determined from the following excerpt from the XML file 306 in relation to Step 10 below, LUN 4 exists in the captured configuration below.
<CLAR:ThinLUs type="Container">
<CLAR:ThinLU type="Category">
<CLAR:WWN type="Property">60:06:01:60:05:54:24:00:2 E:0F:9E:2B:FE:BC:DE:11</CLAR:WWN>
<CLAR:ObjectID type="Property">FNM00090100138-60:06:01:60:05:54:24:00:2 E:0F:9E:2B:FE:BC:DE:11</CLAR: ObjectID>
<CLAR:ThinPoolKey type="Property">02:00:00:00:03:00:00:00</CLAR:ThinPoolKey>
<CLAR:Name type="Property">LUN 4</CLAR:Name>
<CLAR:Number type="Property">4</CLAR:Number>

Step 10: Restore the Thin LUNs specified in the captured configuration above if they do not already exist on the array 200. In the following example, Thin LUNs 1, 2, 3 and 4 were restored.
19-OCT-2009 20:06:49.718-I-Creating Thin LUN 1
19-OCT-2009 20:06:51.390-I-Refreshing the storage system state.
19-OCT-2009 20:06:53.328-I-Checking Thinluns for Thinpool 0
19-OCT-2009 20:06:53.343-I-Checking for Thinlun 1
19-OCT-2009 20:06:53.343-I-CheckThinlun.xml\—Thinlun already exists.
19-OCT-2009 20:06:53.390-I-Checking Thinluns for Thinpool 0
19-OCT-2009 20:06:53.390-I-Checking for Thinlun 2
19-OCT-2009 20:06:53.390-I-Creating Thin LUN 2
19-OCT-2009 20:06:55.000-I-Refreshing the storage system state.
19-OCT-2009 20:06:56.937-I-Checking Thinluns for Thinpool 1

19-OCT-2009 20:06:56.937-I-Checking for Thinlun 3
19-OCT-2009 20:06:56.937-I-Creating Thin LUN 3
19-OCT-2009 20:06:58.515-I-Refreshing the storage system state.
19-OCT-2009 20:06:58.937-I-Checking Thinluns for Thinpool 1
19-OCT-2009 20:06:58.921-I-Checking for Thinlun 4
19-OCT-2009 20:06:58.957-I-Creating Thin LUN 4
19-OCT-2009 20:06:59.515-I-Refreshing the storage system state.
19-OCT-2009 20:06:59.737-I-Checking Thinluns for Thinpool 2
19-OCT-2009 20:07:00.500-I-19-OCT-2009 20:07:00.500 Ending Thin restore An embodiment may implement the techniques herein using code executed by a computer processor. For example, an embodiment may implement the techniques herein and restore engine 308 and other elements shown in FIG. 3 and other Figures, using code which is executed by a processor of the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be access by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in restoring configurations of data storage system, the method comprising:
   capturing a configuration of a data storage system to produce a captured configuration, the configuration comprising a mapping of hierarchical objects;
   using the captured configuration to help ensure that the configuration is not corrupted;
   and
   capturing the configuration in a diagnostic information pool.

2. The method of claim 1, further comprising:
   saving at least some of the captured configuration in an XML file.

3. The method of claim 2, further comprising:
   based on the captured configuration, checking the XML file against the configuration.

4. The method of claim 1, further comprising:
   based on the captured configuration, detecting corruption of the configuration.

5. The method of claim 3, further comprising:
   based on the captured configuration, recreating at least a portion of the configuration as the configuration existed before corruption.

6. The method of claim 1 wherein the mapping of hierarchical objects further comprises mappings among a disk pool, a database, at least one private Redundant Array of Inexpensive Disks (RAID) Group, at least one private Logical Unit Number (LUN), and at least one storage pool.

7. The method of claim 6, further comprising:
   based on the hierarchical objects, creating mapped LUNs within the hierarchical objects.

8. The method of claim 6, further comprising:
   based on the captured configuration, comparing the captured configuration against the mapping of hierarchical objects.

9. The method of claim 8, further comprising:
   based on the comparison, detecting corruption of the configuration.

10. The method of claim 6, further comprising:
    based on the captured configuration, performing a nondestructive bind process on any missing private LUN.

11. The method of claim 1 further comprising:
    based on the captured configuration, restoring any missing hierarchical objects.

12. A computer system comprising a storage processor for use in restoring configurations of data storage systems, the computer system comprising:
    first logic capturing a configuration of a data storage system to produce a captured configuration, the configuration comprising a mapping of hierarchical objects;
    second logic using the captured configuration to help ensure that the configuration is not corrupted; and
    third logic capturing the configuration in a diagnostic information pool.

13. The computer system of claim 12, further comprising:
    third logic saving at least some of the captured configuration in an XML file.

14. The computer system of claim 13, further comprising:
    fourth logic based on the captured configuration, checking the XML file against the configuration.

15. The computer system of claim 14, further comprising:
    fifth logic based on the captured configuration, recreating at least a portion of the configuration as the configuration existed before corruption.

16. The computer system of claim 12, further comprising:
    third logic based on the captured configuration, detecting corruption of the configuration.

17. The computer system of claim 12 wherein the mapping of hierarchical objects further comprises mappings among a disk pool, a database, at least one private Redundant Array of Inexpensive Disks (RAID) Group, at least one private Logical Unit Number (LUN), and at least one storage pool.

18. The computer system of claim 12 further comprising:
    third logic based on the captured configuration, restoring any missing hierarchical objects.

* * * * *